(12) United States Patent
Smith et al.

(10) Patent No.: US 8,762,974 B1
(45) Date of Patent: Jun. 24, 2014

(54) CONTEXT-SENSITIVE COMPILER DIRECTIVES

(75) Inventors: Frederick Mattsson Smith, Natick, MA (US); Alexander Jean-Claude Bottema, Boston, MA (US); Yao Ren, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1298 days.

(21) Appl. No.: 11/173,414

(22) Filed: Jun. 30, 2005

(51) Int. Cl.
 *G06F 9/45* (2006.01)
(52) U.S. Cl.
 USPC .......................................... 717/152; 717/141
(58) Field of Classification Search
 USPC .................................. 717/106, 121, 136–161
 See application file for complete search history.

(56) References Cited

U.S. PATENT DOCUMENTS

| | | | | |
|---|---|---|---|---|
| 5,452,457 A | * | 9/1995 | Alpert et al. | 717/153 |
| 5,905,894 A | * | 5/1999 | De Bonet | 717/146 |
| 6,986,130 B1 | * | 1/2006 | Boucher | 717/151 |
| 7,434,213 B1 | * | 10/2008 | Prakash et al. | 717/152 |
| 7,496,907 B2 | * | 2/2009 | Hind et al. | 717/158 |
| 2003/0037321 A1 | * | 2/2003 | Bowen | 717/149 |
| 2005/0010912 A1 | * | 1/2005 | Adolphson et al. | 717/151 |

OTHER PUBLICATIONS

Grundy, John; "Multiple Textual and Graphical Views for Interactive Software Development Environments"; Jun. 1993, University of Auckland; p. 1-302.*

Some et al.; "Minimizing Parsing when Extracting Information from code in the Presence of Conditional Compliance"; Jan. 1998; Technical Report TR-98-01, University of Ottawa Computer Science; p. 1-19.*

Spenser, Clive; "LPA Win Prolog 4-700 Flex Tutorial"; Logic Programming Associates Ltd.; copyright Jul. 14, 2004; p. 1-68.*

* cited by examiner

*Primary Examiner* — Ryan Coyer
(74) *Attorney, Agent, or Firm* — Nelson Mullins Riley & Scarborough LLP

(57) ABSTRACT

Methods, systems and computer program products are provided for creating and compiling source program code using one or more compiler directives a programming environment. The compiler directives may provide information on how to compile the source program code. The compiler directives may apply to the source program code under a given condition. The compiler directive may appear at the second or lower level of the source program code. The present invention may also provide a compiler that can determine the given condition of the source program code and apply the compiler directives based upon the determination of the given condition.

25 Claims, 3 Drawing Sheets

CONTEXT-SENSITIVE COMPILER DIRECTIVES

FIELD OF THE INVENTION

The present invention relates generally to programming environments, and more particularly to methods, systems and mediums for providing context-sensitive compiler directives in programming environments.

BACKGROUND OF THE INVENTION

In programming environments, users or programmers create source program code and use a compiler to translate the source program into a target program with equivalent behavior. A common target language is machine code which can be directly executed on hardware. Some programming languages allow users or programmers to embed compiler directives in the source program code to provide the compiler with information on how to compile the source program code. These directives usually lead to more efficient target code but do not change the behavior of correct programs. For example, a compiler directive can provide the compiler with information on whether to do range checking on array indexes. In the C programming language, a compiler directive is called a pragma (pragmatic information).

In conventional programming environments, the compiler directives unconditionally apply to the source program code. Also, the compiler directives appear at the top level of the source program code in the conventional programming environments. In some programming instances, however, it is desirable to apply compiler directives only under certain conditions. In other instances, it is needed to introduce compiler directives at the second or lower level of the source program code.

The C programming language supports conditional processing through use of a pre-processor. The C pre-processor can be thought of as a string processing utility that has limited knowledge of C. The pre-processor uses inputs supplied by the user to determine which C code to emit.

Because the C pre-processor directives are processed separately from compilation, none of the context information available to the compiler can be used. Therefore the C pre-processor directives are not part of the C program but rather a separate program that is run before the final C program is compiled.

SUMMARY OF THE INVENTION

The present invention provides a programming environment in which source program code can be created and compiled using one or more compiler directives. The compiler directives may provide information on how to compile the source program code. The present invention provides context-sensitive compiler directives in the programming environment. Context-sensitive means here that the compiler directive is conditionally applied depending on the behavior of the program at run time. The compiler performs a compile-time analysis to predict the run-time behavior and thus determine whether to apply the compiler directive or not. Also, the programming environment of the present invention may enable the compiler directives to appear at the second or lower level of the source program code. The present invention may also provide a compiler that may determine the given condition of the source program code and apply the compiler directives depending upon the determination of the given condition.

In accordance with one aspect of the present invention, a method is provided for creating and compiling a program in a programming environment. The method includes the step of providing at least one compiler directive, wherein the compiler directive provides information on how to compile the program. The method also includes the step of enabling a programmer to create the program using the compiler directive, wherein the compiler directive is used in combination with a conditional expression in the program.

In accordance with one aspect of the present invention, a system is provided for creating and compiling a program. The method includes a programming environment for providing at least one compiler directive, wherein the compiler directive provides information on how to compile the program. The system also includes a user interface element for enabling a programmer to create the program using the compiler directives, wherein the compiler directive is used in combination with a conditional expression in the program.

In another aspect of the present invention, a medium is provided for holding instructions executable in a computational device for a method. The method includes the step of providing at least one compiler directive, wherein the compiler directive provides information on how to compile the program. The method also includes the step of enabling a programmer to create the program using the compiler directive, wherein the compiler directive is used in combination with a conditional expression in the program.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
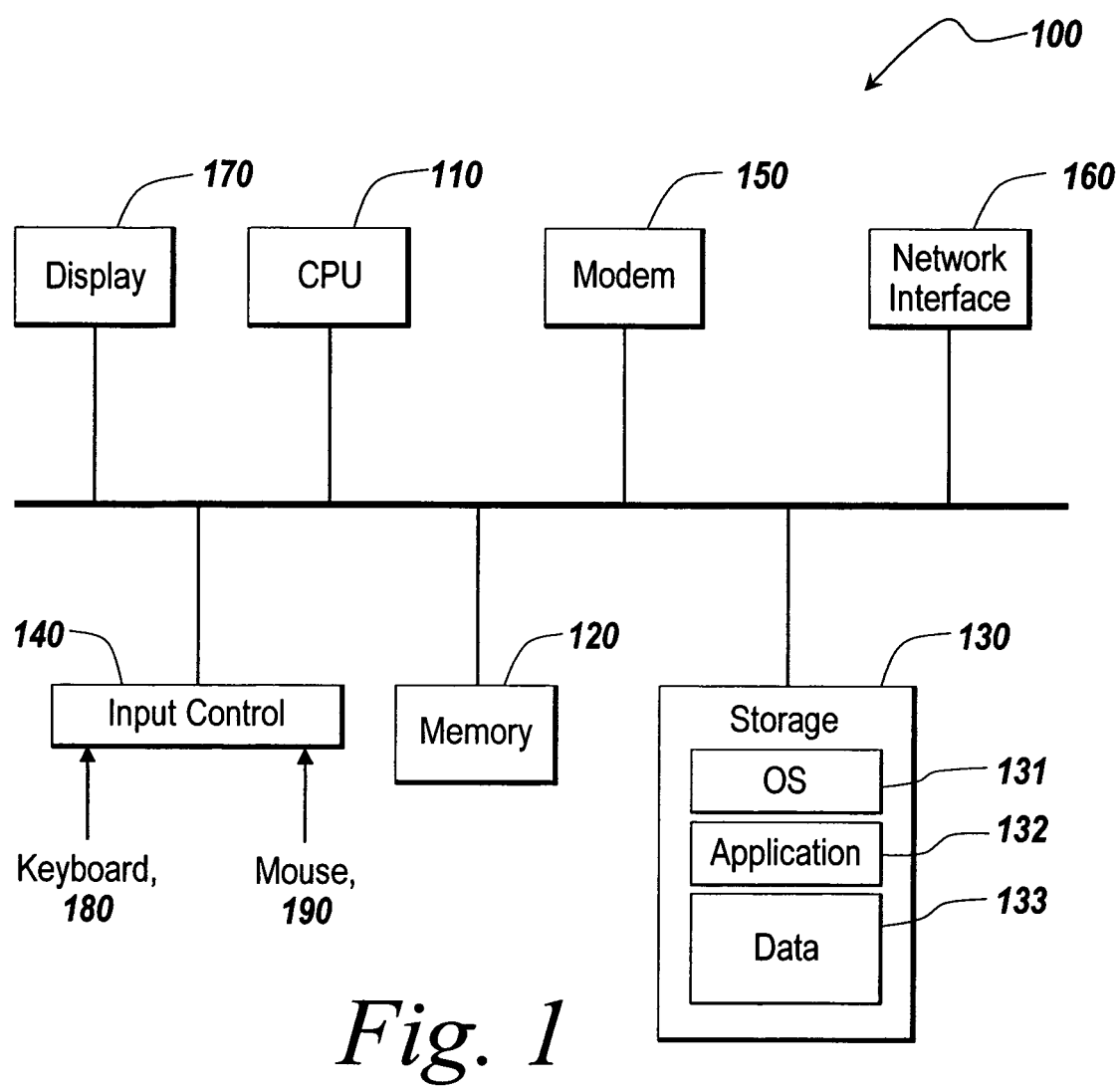
FIG. 1 is an exemplary computational device suitable for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a programming environment in which source program code is created and compiled and compiler directives are used. The programming environment may be a text-based programming environment or a graphical programming environment. The compiler directives may be embedded in the source program code to provide a compiler with information on how to compile the source program code. The compiler directives specify an action to be performed by the compiler. The compiler directives supply the compiler with directions for its operation but do not get translated directly into executable code.

An exemplary programming environment that provides compiler directives can be found in Simulink®. The Embedded MATLAB® Function block in the Simulink® programming environment is used to compile a subset of the MATLAB® programming language into efficient C code. That compilation process makes use of context-sensitive compiler directives to generate more efficient code.

MATLAB® from The MathWorks, Inc. of Natick, Mass. is an intuitive high performance language and technical computing environment. MATLAB® provides mathematical and graphical tools for data analysis, visualization and application development. MATLAB® integrates computation and programming in an easy-to-use environment where problems and solutions are expressed in familiar mathematical notation. MATLAB® is an interactive system whose basic data element is an array that does not require dimensioning. This allows users to solve many technical computing problems, especially those with matrix and vector formulations, in a fraction of the time it would take to write a program in a scalar non-interactive language, such as C and FORTRAN.

The illustrative embodiment will be described solely for illustrative purposes relative to a MATLAB® programming environment. Although the illustrative embodiment will be described relative to MATLAB® programming environment, one of ordinary skill in the art will appreciate that the present invention may apply to other programming environments as long as the programming environments provides compiler directives.

In the illustrative embodiment of the present invention, a compiler directive may be embedded in the source program code using a control flow statement so that the compiler directive applies to the source program code depending upon a given condition of the control flow statement. The control flow statement controls or changes the flow of the program. The control flow statement may include an if-statement, a switch-statement, a for-statement or a while-statement. One of skill in the art will appreciate that these control flow statements are illustrative and the present invention may be practiced with any other control flow statements that can control the flow of the program.

Since the compiler directive is embedded within a control flow statement in the illustrative embodiment, the compiler directive embedded in the source program code may appear at the second or lower level of the source program code. The compiler provided in the illustrative embodiment of the present invention may determine the given condition of the control flow statement and apply the compiler directive depending on the determination of the given condition.

FIG. 1 is an exemplary computational device 100 suitable for practicing the illustrative embodiment of the present invention, which provides a programming environment. One of ordinary skill in the art will appreciate that the computational device 100 is intended to be illustrative and not limiting of the present invention. The computational device 100 may take many forms, including but not limited to a workstation, server, network computer, quantum computer, optical computer, bio computer, Internet appliance, mobile device, a pager, a tablet computer, and the like.

The computational device 100 may be electronic and include a Central Processing Unit (CPU) 110, memory 120, storage 130, an input control 140, a modem 150, a network interface 160, a display 170, etc. The CPU 110 controls each component of the computational device 100 to provide the programming environment. The memory 120 temporarily stores instructions and data and provides them to the CPU 110 so that the CPU 110 operates the computational device 100 and runs the programming environment. The storage 130 usually contains software tools for applications. The storage 130 includes, in particular, code 131 for the operating system (OS) of the device 100, code 132 for applications running on the operation system including applications for providing the programming environment, and data 133 for the program generated in the programming environment.

The input control 140 may interface with a keyboard 180, a mouse 190, and other input devices. The computational device 100 may receive through the input control 140 input data necessary for creating and compiling programs in the programming environment. The computational device 100 may display in the display 170 user interfaces for the users or programmers to create or edit or compile the programs in the programming environment.

Figure 2:
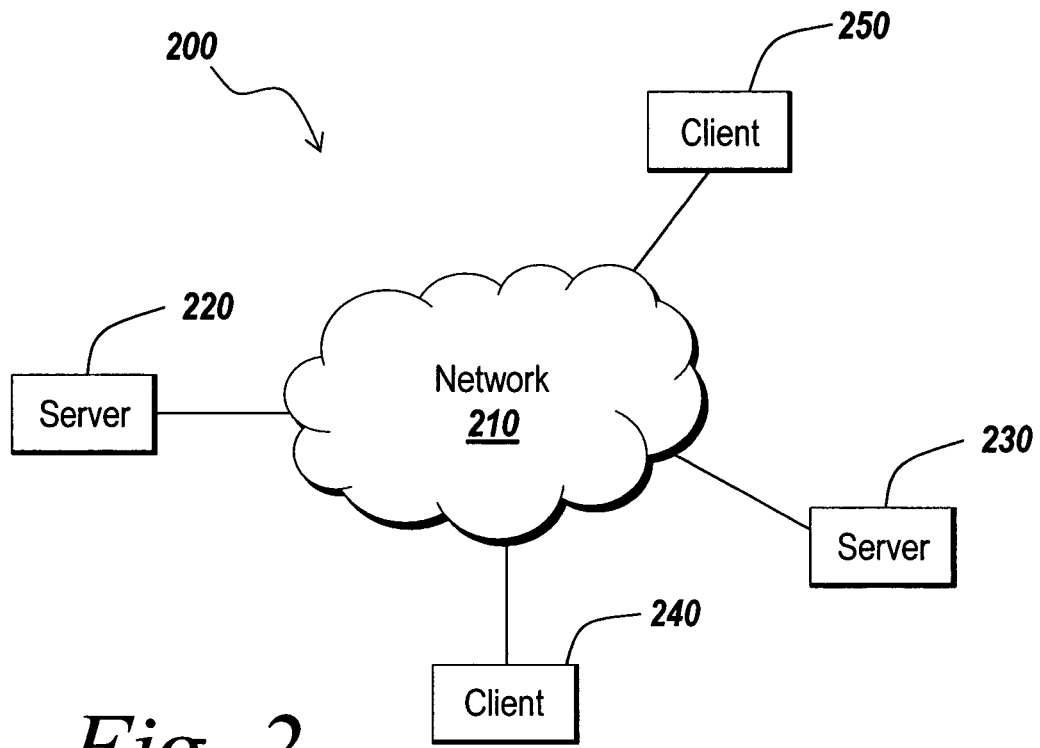
FIG. 2 is an exemplary network environment that enables a distributed implementation of the present invention.

FIG. 2 is an exemplary network environment 200 suitable for the distributed implementation of the illustrative embodiment. The network environment 200 may include one or more servers 220 and 230 coupled to clients 240 and 250 via a communication network 210. The servers 220 and 230 and clients 240 and 250 can be implemented using the computational device 100 depicted in FIG. 1. The network interface 160 and the modem 150 of the computational device 100 enable the servers 220 and 230 to communicate with the clients 240 and 250 through the communication network 210. The communication network 210 may include Internet, intranet, LAN (Local Area Network), WAN (Wide Area Network), MAN (Metropolitan Area Network), etc. The communication facilities can support the distributed implementations of the present invention.

In the network environment 200, the servers 220 and 230 may provide the clients 240 and 250 with software components or products under a particular condition, such as a license agreement. The software components or products may include those for providing a programming environment. The software components or products may also include programs running in the programming environment. The clients 240 and 250 may create a program and request the servers 220 and 230 to compile and/or execute the program. The servers 220 and 230 may receive a program from the clients 240 and 250, compile and/or execute the program on the server 220 and 230, and provide the clients 240 and 250 with the results of compiling and/or executing the program.

Figure 3:
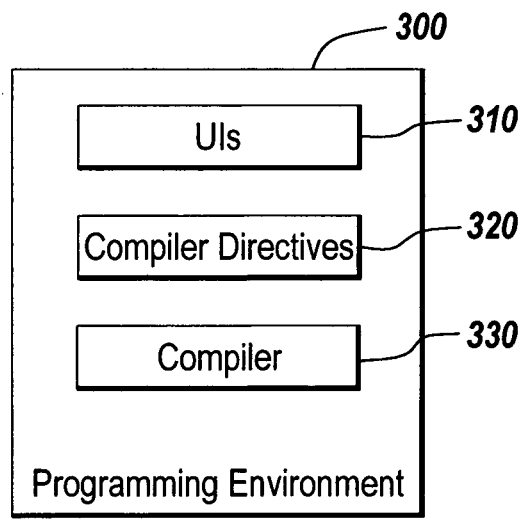
FIG. 3 is an exemplary programming environment provided in the illustrative embodiment of the present invention.

FIG. 3 is an exemplary programming environment 300 provided in the illustrative embodiment of the present invention. The programming environment 300 may include user interfaces (UIs) 310, compiler directives 320 and a compiler 330. The UIs 310 may enable users or programmers to create or edit a source program in the programming environment 300. The UIs 310 may be provided in an editor. Users or programmers can type in program code using the UIs 310 provided in the editor.

A program is an entity which is executable and has semantics. The semantics of a programming environment may be given in documentation, a formal specification, or through an exemplary implementation. The semantics specify what programs are valid and what constitutes correct behavior for valid programs.

The compiler 330 is a tool that takes as input a source program and translates it into a target program with equivalent behavior. A compiler is distinguished from other tools in that it preserves the behavior of the source program within the limits specified by the semantics. That is, the source and target programs may behave slightly differently provided both are valid interpretations of the semantics of the source program. Compilers are often used to translate a high-level symbolic source program into directly executable machine code.

The programming compiler directives 320 may provide the compiler 330 with the information on the compilation of the source program code in the programming environment 300. The compiler directives 320 are used to guide the way the compiler 330 goes about generating target code from the source program code. An example of the compiler directives 320 can be the "inline" compiler directive. The "inline" compiler directive replaces calls to user-defined functions with the code representing the functions. For example, if source program code includes a user-defined function, such as x=Sum (3, 4), the "inline" compiler directive directs the compiler 330 to replace the Sum function with the following exemplary assembly code representing the Sum function.

LD r1, 3
    LD r2, 4
    ADD r1, r2

The "inline" directive helps the user override the heuristics the compiler 330 is using to decide when to inline a function. The "inline" compiler directive can improve performance by saving the expense of the function call overhead. One of ordinary skill in the art will appreciate that the "inline" compiler directive is an exemplary compiler directive and the present invention may be practiced with other compiler directives, such as the "non-inline" compiler directive.

Other compiler directives may include compiler directives that determine:

(1) whether a matrix variable is diagonal,
(2) whether a variable should be stored in a register, or
(3) the range of values assumed by a variable.

Any information the compiler 330 normally computes or that is useful for optimization can be directly supplied by the user in the compiler directives 320. Any time a compiler 330 is using a heuristic to make decisions, the compiler directives 320 can be used to guide that decision making process.

Figure 4:
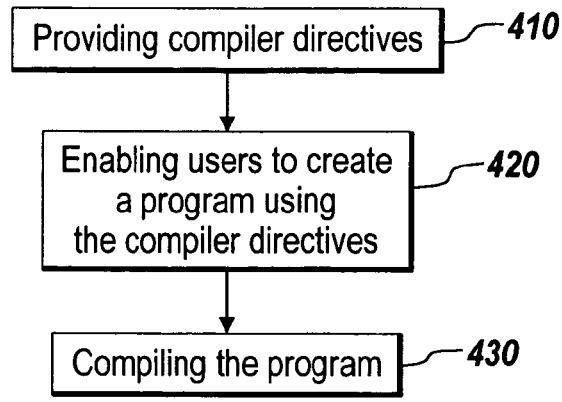
FIG. 4 is a flow chart illustrating an exemplary operation for creating and compiling a program in the programming environment.

FIG. 4 is a flow chart illustrating an exemplary operation for creating and compiling a program in the programming environment 300. The programming environment 300 provides compiler directives 320, such as the "inline" compiler directive (step 410). The programming environment 300 provides the UIs 310 and enables the users or programmers to create a source program in the programming environment 300 (step 420). In particular, the users or programmers can create the source program code using the compiler directives 320 provided in the programming environment 300.

Generally, the compiler directives 320 appear at the top level of the source program code and apply to the source program code unconditionally. In the illustrative embodiment, the compiler directives 320 can apply to the source program code under certain conditions. The compiler directives 320 may be embedded in the source program code using a control flow statement. The compiler directives 320 can be embedded within the control flow statement and appear at the second or lower level of the source program code. The compiler directives 320 may apply to the source program code depending upon the given condition of the control flow statement.

Figure 5:
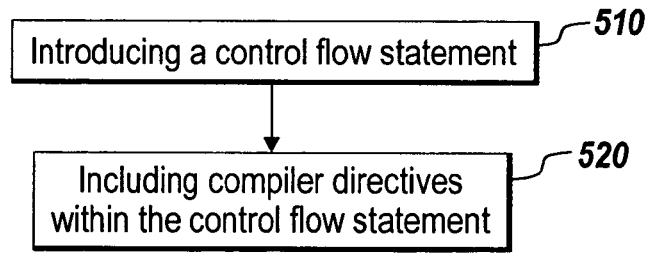
FIG. 5 is a flow charts illustrating an exemplary operation for creating a program in the programming environment.

FIG. 5 is a flow chart illustrating an exemplary operation for creating a program in the programming environment 300. The users or programmers can introduce a control flow statement into the program (step 510). The control flow statement refers to a statement that controls or changes the flow of the program. The control flow statement may include a conditional branch statement, such as an if-statement, if-else-statement, and a switch-statement. One of skill in the art will appreciate that the conditional branch statements are illustrative and the present invention may be practiced with other control flow statements, such as a conditional repetition statement including a for-statement and a while-statement, that can control the flow of the program. The compiler directives 320 can be included within the control flow statement (step 520).

By being included in the control-flow of the program, the compiler directive may or may not be applied depending on the run-time behavior of the program. The compiler must use an analysis to predict the run-time behavior and thus determine whether the directive is definitely applied, definitely not applied, or unknown. One skilled in the art will recognize that standard analysis techniques can be used to make these predictions. An illustrative example of an analysis technique that may be used is partial evaluation.

For example, the MATLAB®-based programming environment supports the "must_inline" compiler directive to force inlining. The users or programmers may create a source program in the MATLAB®-based programming environment to include the "must_inline" directive in a control flow statement, as described below.

function c=divide(a,b)
    if isscalar(a) && isscalar(b)
    must_inline;
    c=a/b;
    else
    c=matrix_divide(a,b);
    end In the exemplary code described above, the users or programmers can embed the "must_inline" compiler directive in the control flow of the program to force the divide function to be inlined if the inputs are scalar. If one of the inputs is not a scalar, the "must_inline" compiler directive does not apply and therefore the matrix divide function is not inlined. Those of ordinary skill in the art will appreciate that the if-else statement is an illustrative control flow statement and the present invention may be practiced with any other control flow statements. Those of ordinary skill in the art will also appreciate that the "must_inline" compiler directive is an exemplary compiler directive and the present invention may be practiced with other compiler directives, such as the "must_not_inline" compiler directive for preventing functions from being inlined, and the "unroll_loop" compiler directive for unrolling a loop.

Figure 6:
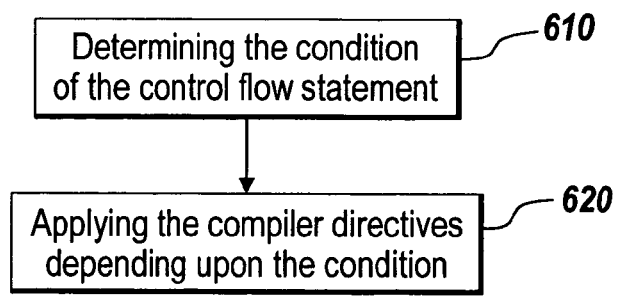
FIG. 6 is a flow chart illustrating an exemplary operation for compiling a program in the programming environment.

Referring back to FIG. 4, the compiler 330 may compile the source program in the programming environment 300. The compiler 330 may interpret the program and convert it to an executable format. FIG. 6 is a flow chart illustrating an exemplary operation for compiling a program in the programming environment 300. The compiler 330 may determine the given condition of the control flow statement in the source program code (step 610). If the given condition is met for the compiler directive, the compiler 330 applies the compiler directives 320 to the source program code (step 620).

In the exemplary source code described above, if the compiler 330 cannot determine whether or not "a" and/or "b" are scalars, the compiler 330 does not know whether the compiler directives 320 apply or not. There may be multiple possible interpretations in such a situation:

(a) This situation can be treated as an error because there are paths through the function that will not encounter the compiler directive and other paths that will encounter the compiler directive.

(b) The compiler 330 may enable the compiler directive to apply to the source program code because there is a control flow path containing the compiler directive.

(c) The compiler 330 may ignore the compiler directive because the condition is provided ambiguously.

If one of these alternatives is selected, standard compiler technologies can be used to determine whether or not the statement containing the compiler directive is executed or not.

In the illustrative embodiment described above, a compiler directive can be context-sensitive if it is used in a control flow statement, such as an if statement. Alternatively, the compiler directive can also be context-sensitive by taking a Boolean input, as described below.

must_inline(isscalar(a) && isscalar(b))

The compiler directive used in a control flow statement and the compiler directive taking a Boolean input are equivalent from a compiling standpoint. The difference of the compiler directive taking a Boolean input is that users predicate the compiler directive on the Boolean value of an expression. The compiler can figure out if the expression is definitely true, definitely false, or unknown.

Although the illustrative embodiment of the present invention is described relative to a text-based programming environment, one of ordinary skill in the art will appreciate that the present invention may be practiced in a graphical programming environment. For example, in a block diagram environment, such as those provided in Simulink® from The MathWork, Inc. of Natick, Mass., a compiler directive block may be provided so that the users or programmers can incorporate the compiler directive block into a block diagram. The compiler directive block can be used with the control flow blocks, such as an if block, a switch block, a for block, a while block, etc, so that the compiler directive block is applied under a certain condition.

Just as in the textual example, standard compiler analyses would be used to determine whether or not simulation of the model would enable this compiler directive block.

In yet another embodiment, an action language can be used within a graphical programming environment that allows textual conditional compiler directives. That is, a graphical model may include textual conditional compiler directives. For example, a Gain block in a Simulink® model may have a 'Loop unrolling limit' entry where the user can enter a number. If the number of elements in the input to the Gain block is less than this number the loop in the generated code would be fully unrolled. In the case where the input signal has variable size this entry would constitute a context-sensitive compiler directive because the compiler would have to deduce whether in this particular model all inputs are in fact less than the specified limit before unrolling the loop. With traditional compiler directives this kind of optimization would only be possible for input signals of fixed size.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any programming environment that provides compiler directives. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a computational device providing a programming environment, a method comprising:
    providing a compiler directive;
    creating a program using the compiler directive, the creating comprising:
        embedding the compiler directive in the program, where the compiler directive:
            is embedded in the program prior to a compile-time analysis,
            appears in the program in combination with a condition associated with a function or a unit of the program, and
            is applied to the program during compilation of the program when the condition is satisfied;
    performing the compile-time analysis of the program;
    predicting a run-time behavior of the program based on the compile-time analysis;
    evaluating the condition based on the predicted run-time behavior of the program;
    determining whether to apply the compiler directive to the program, the determining comprising:
        determining that the condition is satisfied,
        applying the compiler directive to the program, the applying based upon the determining that the condition is satisfied, and
        providing, via the compiler directive, a command, the command specifying how to compile the program based on the predicted run-time behavior of the program, where:
            the command is provided subsequent to the compile-time analysis; and
    generating, using the program, a compiled program based on the runtime analysis.

2. The method of claim 1, wherein the function or the unit of the program is invoked to determine that the condition is satisfied.

3. The method of claim 1, wherein
    the compiler directive is provided in a control flow statement.

4. The method of claim 1, wherein
    the compiler directive is used with a Boolean expression.

5. The method of claim 1, wherein the compiler directive overrides a heuristic used in making a decision during the compilation of the program.

6. The method of claim 1, wherein the programming environment comprises a text-based programming environment.

7. The method of claim 1, wherein the programming environment comprises a graphical programming environment.

8. The method of claim 1, wherein the programming environment comprises a graphical programming environment and the compiler directive comprises a textual conditional compiler directive.

9. The method of claim 1, wherein the compiler directive comprises an inline directive for inlining one or more functions in the program.

10. A system comprising:
    a processor configured to execute instructions for:
        embedding a compiler directive in a program, where the compiler directive:
            is embedded in the program prior to a compile-time analysis, appears in the program in combination with a condition associated with a function or a unit of the program, and is applied to the program during compilation of the program when the condition is satisfied embedded in the program prior to a compile-time analysis, performing the compile-time analysis of the program, predicting a run-time behavior of the program based on the compile-time analysis, evaluating the condition based on the predicted run-time behavior of the program, determining whether to apply the compiler directive to the program, the determining comprising:

determining that the condition is satisfied, applying the compiler directive to the program, the applying based upon the determining that the condition is satisfied, and providing, via the compiler directive, a command, the command specifying how to compile the program based on the predicted run-time behavior of the program, where:

the command is provided subsequent to the compile-time analysis, and generating, using the program, a compiled program based on the runtime analysis.

11. The system of claim 10, wherein the compiler directive is used in a control flow statement.

12. The system of claim 10, wherein the compiler directive is used with a Boolean expression.

13. The system of claim 10, wherein the compiler directive overrides a heuristic used in making a decision during compilation of the program.

14. The system of claim 10, wherein the programming environment comprises a text-based programming environment.

15. The system of claim 10, wherein the programming environment comprises a graphical programming environment.

16. The system of claim 10, wherein the programming environment comprises a graphical programming environment and the compiler directive comprises a textual conditional compiler directive.

17. The system of claim 10, wherein the compiler directive comprises an inline directive.

18. A non-transitory medium storing instructions that, when executed in a computational device, cause the computational device to:

provide a compiler directive;

create a program using the compiler directive, the creating comprising:

embedding the compiler directive in the program, where the compiler directive:

is embedded in the program prior to a compile-time analysis, appears in the program in combination with a condition associated with a function or a unit of the program, and is applied to the program during compilation of the program when the condition is satisfied;

perform the compile-time analysis of the program;

predict a run-time behavior of the program based on the compile-time analysis;

evaluate the condition based on the run-time behavior of the program;

determine whether to apply the compiler directive to the program, the determining comprising:

determining that the condition is satisfied, applying the compiler directive to the program, the applying based upon the determining that the condition is satisfied, and providing, via the compiler directive, a command, the command specifying how to compile the program based on the predicted run-time behavior of the program, where:

the command is provided subsequent to the compile-time analysis; and generate, using the program, a compiled program based on the runtime analysis.

19. The medium of claim 18, wherein the compiler directive is used in a control flow statement.

20. The medium of claim 18, wherein the compiler directive is used with a Boolean expression.

21. The medium of claim 18, wherein the compiler directive overrides a heuristic used in making a decision during compilation of the program.

22. The medium of claim 18, wherein the programming environment comprises a text-based programming environment.

23. The medium of claim 18, wherein the programming environment comprises a graphical programming environment.

24. The medium of claim 18, wherein the programming environment comprises a graphical programming environment and the compiler directive comprises a textual conditional compiler directive.

25. The medium of claim 18, wherein the compiler directive comprises an inline directive.

* * * * *